United States Patent [19]

Block

[11] Patent Number: 6,073,102
[45] Date of Patent: Jun. 6, 2000

[54] SPEECH RECOGNITION METHOD

[75] Inventor: Hans-Ulrich Block, Munich, Germany

[73] Assignee: Siemens Aktiengesellschaft, Munich, Germany

[21] Appl. No.: 08/839,922

[22] Filed: Apr. 21, 1997

[30] Foreign Application Priority Data

Apr. 19, 1996 [DE] Germany ............................ 196 15 693

[51] Int. Cl.⁷ ...................................................... G10L 7/08
[52] U.S. Cl. .......................................... 704/275; 704/272
[58] Field of Search .................................. 395/11, 12, 61; 704/275, 270, 200, 272

[56] References Cited

U.S. PATENT DOCUMENTS

| | | | |
|---|---|---|---|
| 4,689,737 | 8/1987 | Grant | 704/8 |
| 4,736,296 | 4/1988 | Katayama et al. | 364/419 |
| 4,763,277 | 8/1988 | Ashford et al. | 395/65 |
| 4,907,167 | 3/1990 | Skeirik | 364/500 |
| 5,577,165 | 11/1996 | Takebayashi et al. | 704/275 |
| 5,627,940 | 5/1997 | Rohra et al. | 395/12 |
| 5,694,558 | 12/1997 | Sparks et al. | 704/9 |
| 5,701,400 | 12/1997 | Amado | 395/76 |

FOREIGN PATENT DOCUMENTS

| | | | |
|---|---|---|---|
| 0 118 187 A1 | 9/1984 | European Pat. Off. | G06F 3/37 |
| 98/31007 | 7/1998 | WIPO . | |

OTHER PUBLICATIONS

J. Markowitz, *Using Speech Recognition*, Prentice Hall PTR, ISBN 0-13-186321-5, pp. 206-213 (1996).

D. Goddeau, et al., *Galaxy: A Human-Language Interface to On-Line Travel Information*, Proc. International Conference on Spoken Language Processing, Yokohama, pp. 1-4.

R. Caspari, *Bottom Up Generation from Flat Semantic Structures*, Proc. Deklarative und prozedurale Aspekte der Sprachverabeitung, Deutsche Gesellschaft fur Sprachverabeitung, Sektion Computerlinguistik, 4. Fachtagung, pp. 1-6.

*Primary Examiner*—Richemond Dorvil
*Attorney, Agent, or Firm*—Hill & Simpson

[57] ABSTRACT

Proceeding from a command or request that a user (B) gives a speech recognition system, an action is first determined from a prescribable plurality of actions upon employment of action indicators that the action information pertains to. A first set of actions is thereby determined and stored wherein all action indicators coincide with the key concepts. Further, a second set of actions is determined and stored wherein at least a part of the action indicators coincide with the key concepts. The first set of actions and/or the second set of actions is employed as a basis for the unambiguous determination of the action. For the at least one determined action, the action parameters respectfully allocated to the action are determined upon employment of a parameter parser (PP). The sought action is implemented in a last step.

20 Claims, 6 Drawing Sheets

SPEECH RECOGNITION METHOD

BACKGROUND OF THE INVENTION

The present invention generally relates to computer systems. More specifically the invention relates to dialog arrangements and methods for interrogating a user and taking action relevant thereto.

From the point of view of the user, background systems can often be interpreted as a set of possible actions for whose execution a set of parameters must be known. When operating such systems, the user must inform the system of the action and of the parameters.

Arrangements for action determination, for example information systems, select the soft action on the basis of information that a user gives to the arrangement and implement this action. For determining the information, it is partly necessary to carry out a dialog with the user if the information provided over by the user is inadequate for determining the information that is actually sought.

Various arrangements and methods are known for designing dialogs and, for the corresponding dialog system, which is what an arrangement for determining information upon employment of an additional dialog between the arrangement and the user is called. In J. Markowitz, Using Speech Recognition, Prentice Hall PTR, ISBN 0-13-186321-5, pp. 206–213, 1996 there is disclosed a method for dialog design wherein the respective dialog is modeled with a finite automaton or with predetermined dialog menus as well. A branching tree is thereby produced for each application. The information needed for the branching is obtained by are interrogating the user. It is thereby standard, for example, to establish fixed dialog trees.

An arrangement and a method for dialog design employing a natural language dialog is also disclosed in Goddeau, D., E. Brill, J. Glass, C. Pao, M. Phillips, J. Polifroni, S. Seneff and V. Zue, 1994: GALAXY: A Human-Language Interface to On-line Travel Information. Proc. International Conference on Spoken Language Processing, Yokohama, pp. 1–4. Dialog systems of this type allow the user to formulate his request in everyday language, for example, "I would like to travel today from Munich to Hamburg". In natural language dialog systems, the expression of the user is syntactically and semantically analyzed. The result is a formal semantic representation of the content of the expression. What action the user would like to begin and what parameters he has already named are determined from the semantic representation of the expression. The dialog system determines therefrom what parameters still must be revealed for the implementation of the action and asks a corresponding question, for example, "Would you like to fly or travel by train?". The user's answer is again syntactically/semantically analyzed. The sought parameter is determined from the semantic representation.

In this method or, respectively, dialog system two different approaches are fundamentally distinguished.

Pulman, S. G., H. Alshawi, D. M. Carter, R. S. Crouch, M. Rayner and A. G. Smith, 1993: CLARE: A Combined Language and Reasoning Engine, Proc. of the JFIT conference, pp. 1–8 discloses a method and a dialog system wherein a universal analysis module is employed that, in the ideal case, should be in a position to syntactically and semantically analyze every statement and supply a canonic, semantic representation of the literal significance. What is referred to as a reasoning component is utilized for the dialog design, this, on the one hand, logging the course of the dialog and, on the other hand, determining the parameters that are still needed for the action determination and, further, imaging the canonic, semantic representation onto a potential background application. Methods of knowledge representation and knowledge processing are usually utilized on the background application for imaging the canonic semantic representation.

Goddeau, D., E. Brill, J. Glass, C. Pao, M. Phillips, J. Polifroni, S. Seneff and V. Zue, 1994: GALAXY: A Human-Language Interface to On-line Travel Information. Proc. International Conference on Spoken Language Processing, Yokohama, pp. 1–4 discloses another approach wherein what are referred to as "semantic grammars" are developed for every conceivable user statement, these converting the statement into a semantic representation directly, i.e., without a detour via the syntax analyzer. The dialog design and the imaging onto the background application that is eventually provided usually ensues in the same way as was described above in the method and the dialog system from the Pulman et al. report.

The known methods or, respectively, dialog systems exhibit many disadvantages.

The method or, respectively, dialog system disclosed by J. Markowitz, referred to above, is in fact extremely rugged but exhibits the disadvantage that it allows the user no degrees of freedom whatsoever in dialog management. Over and above this, the entire, existing branching tree must be investigated given an expansion of the dialog system or, respectively, of the method by a new action, and must be potentially redesigned in order to take the new action into consideration at a corresponding location. This denotes a substantial outlay that can incur extremely high costs. For this reason, the J. Markowitz method or, respectively, dialog system is extremely inflexible and can be expanded only given large outlay.

The approach known from the Pulman et al. report exhibits the disadvantage that this approach has not yet succeeded in developing a grammar of a natural language that is in a position to analyze all possible statements of a user. Therefore this method and the dialog system corresponding thereto, is not rugged.

Over and above this, the aging of the generic significance representation onto the background application involves great outlay. This approach, just like the approach described by Goddeau et al., is also extremely complex and, thus, complicated to implement or, respectively, realize, this leading to high costs of both of these approaches. The expandability and, thus, the flexibility in any of these approaches are established to only an extremely limited extent.

It must be taken into consideration in the expandability of a system that a substantial outlay must be invested into the development of the grammars for each new application and these jobs can only be carried out by extremely qualified personnel. The approaches of Goddeau aet al. and Pulman et al. are thus disproportionately complicated for most applications, even though the approach of Goddeau et al. is generally more rugged than the approach of Pulman et al. since only the user expressions possible in the specific application need be taken into consideration in the development of the semantic grammar.

SUMMARY OF THE INVENTION

The invention is thus based on the problem of providing an arrangement and a method that avoid the afore-mentioned disadvantages of known arrangements and methods.

In an embodiment the invention provides A speech recognition using digital action information that is given to the system by a user, comprising:

(a) at least one input means EM is for input of a command, (b) an input memory ESP for storing a command, (c) an action determination unit (AE) for determining at least one action which is indicated by an action indicator, the action determination unit (AE) is being constructed such that (1) a first set of actions is formed in which the actions are stored wherein all action indicators coincide with at least one part of prescribable key concepts that are allocated to an action, (2) that a second set of actions is formed in which the actions are stored wherein at least a part of the action indicators coincide with at least the part of the prescribable key concepts, and (3) the first set of actions and/or the second set of actions is employed as basis for the unambiguous determination of the action indicated by the command, and (d) a parameter parser (PP) with which action parameters prescribable from the command that are allocated to an action and are employed for the execution of the action are identified. As used herein, the phrase "action information" also means "command" or the like. In an embodiment, the invention provides a speech recognition method using a computer, comprising the steps of:

(a) providing a command to the computer by a user, (b) storing the command in a memory, (c) from prescribable actions to which a prescribable plurality of action parameters are allocated, determining at least one action on the basis of that least one action indicator in the command, (d) storing a first set of actions wherein all action indicators coincide with the key concepts and a second set of actions wherein at least a part of the action indicators coincide with the key concepts, and (e) employing the first set of actions and/or the second set of actions as a basis for the unambiguous determination of the action, (f) determining for the action the action parameters that are allocated to the action and that are employed for the execution of the action, and (g) implementing the determined action.

An input means for the input of action information (i.e., a command) is provided in the arrangement. The is input into the arrangement by the user via the input means, and the action information is stored in an input memory that is provided. Further, an action determination unit is provided that is fashioned such that at least one action that is referenced by the action indication is determined from a plurality of prescribable actions based on the digital action information. The action determination unit is fashioned such, that a first set of actions is formed in which the actions are stored wherein all action indications coincide with at least a part of prescribable key concepts that are allocated to an action, and such that a second set of actions is formed in which the actions are stored wherein at least a part of the action indications coincide with at least the part of the prescribable key concepts. A parameter parser is provided with which action parameters are determined from the action information. An information data bank is provided from which the sought information is determined on the basis of the action as well as the action parameters.

In the inventive method, the digital action information is input into the arrangement for action determination by a user via an input means. The action information is stored in an input memory. Upon employment of the input action indications, at least one action is determined from prescribable actions. A first set of actions is determined and stored wherein all action indications coincide with the key concepts. A second set of actions is determined and stored wherein at least a part of the action indications coincide with the key concepts. The first set of actions and/or the second set of actions is employed as basis for the unambiguous determination of the action. Action parameters are determined for the specific action from the action information on the basis of a parameter parser. The determined action is implemented in a last step.

The inventive arrangement as well as the inventive method comprise some substantial advantages compared to the prior art.

As a result of the action determination unit as well as the determination of the action from a plurality of prescribable actions, the method can be implemented more simply and faster with the assistance of a computer, and the arrangement is more simply designed. This leads to a more cost-beneficial realization of the arrangement or, respectively, to a more cost-beneficial implementation of the method, particularly with respect to the required calculating time. A substantial saving of calculating time is achieved by the determination of the action at the beginning of the method and the subsequent determination of the corresponding parameters for the respective action.

The arrangement and the method are further distinguished in that it is possible to determine an action from a plurality of prescribable actions in a very simple way and to determine the predetermined action parameters for this action. A very simple arrangement for action determination is thus realized that is very flexibly designed and that can be expanded in a simple way with new applications and actions without special, highly qualified and, thus, expensive personnel having to be utilized.

It is provided in a development of the inventive arrangement that the input means be fashioned as a speech recognition unit and/or as a tactile input unit. A user-friendly transfer of the action information by the user to the arrangement for action determination is enabled by this fashioning.

It is also advantageous to provide an action clarification unit for determining further action indications from the user. This is advantageous in case adequate action indications are not contained in the action information, these being adequate for the unambiguous determination of an action from the predetermined plurality of actions.

In a further development, a parameter explanation unit is provided for determining further action parameters for at least one identified action. This development makes it possible to process cases wherein all action parameters of an action could not be determined from the digital action information without greater outlay, as a result whereof a further spectrum of applications of the arrangement is realized in a simple way.

It is provided in a further development of the arrangement that the action determination unit be fashioned such that key concepts are allocated to the predetermined actions, these being compared to the action indications and those actions being defined as actual actions whose key concepts agree best with the action indication with respect to a prescribable similarity degree. With this development, the arrangement is kept extremely simple and, thus, this arrangement can be even more cost-beneficially realized.

In order to realize a user-intuitive and more flexible arrangement, it is advantageous to provide a key word editor in a development of the arrangement with which both the key words as well as modifications or expansions of actions and/or action parameters can be input by the user or by a developer. Further, actions and grammars that are described farther below can be changed, expanded or, respectively, adapted in a simple way with the key word editor.

For a more flexible design of the arrangement, it is advantageous in one development to provide a means for generating questions to the user for determining further action indications and/or further action parameters.

In a development of the arrangement, further, it is advantageous to determine information for the respective action on the basis of the action parameters and on the basis of an information data bank.

An output unit for presenting the identified information to the user is provided in a development of the invention for an arrangement for displaying the identified information.

In a development of the arrangement, further, a control unit is provided for controlling a background application upon employment of the identified information. The coupling of the arrangement for action determination to the greatest variety of systems there are described farther below is thus enabled.

It is advantageous in a development of the inventive method that the action information is spoken by the user and this information is recognized in a speech recognition unit. A result of this development, the interaction of the arrangement for action determination with the user becomes substantially more user-intuitive, simpler and, thus, faster to implement.

It is also advantageous in a development of the method to implement the interaction with the user via a tactile input unit. The implementation of the method becomes simpler and more user-intuitive as a result of this development as well.

Making the method more flexible is achieved by a development wherein further action indications are determined in a prescribable dialog of the computer with the user for that case wherein the action indication is not adequate for an unambiguous identification of an action.

It is provided in a further development of the invention to select a procedure for the determination of the action wherein key concepts are allocated to the actions, and the action indications are compared to the key concepts and the at least one action is determined via the comparison. This development is marked by its simplicity, this representing a substantial advantage of this development. A simple expansion of key concepts for the respective action and, thus, a simple modification of the corresponding actions is also easily possible.

It is also advantageous in a development of the method that the parameter parser develops the action parameters from the action information in reverse sequence with respect to the input, as a result whereof a correction of the user's statement within a syntactic unit, i.e., for example, within a sentence, can be corrected and this correction can also be taken into consideration without further ado.

It is also advantageous in a development of the method to provide a controller of a background application in the method, as a result whereof a broad application spectrum of the inventive method is opened up. Both the arrangement as well as the method can be advantageously utilized in the greatest variety of fields. One possibility for an advantageous employment of the arrangement or, respectively, of the method may be seen in any type of telephone service or tele-purchasing system tele-banking systems as well.

Further, the arrangement or, respectively, the method can be advantageously utilized in what I refer to as messaging systems of private branch exchanges of a communication system.

A further advantageous employment may be seen in what is referred to as a voice mail handling system. The method and the application [sic] can also be very advantageously employed for controlling an arbitrary machine, for example a machine tool or any other type of machine. Further, a computer, particularly a window-based input system of a computer, can be very advantageously controlled with the arrangement and the method.

An exemplary embodiment is shown in the Figures and is explained in greater detail below.

DETAILED DESCRIPTION OF THE PRESENTLY PREFERRED EMBODIMENTS

Figure 1:
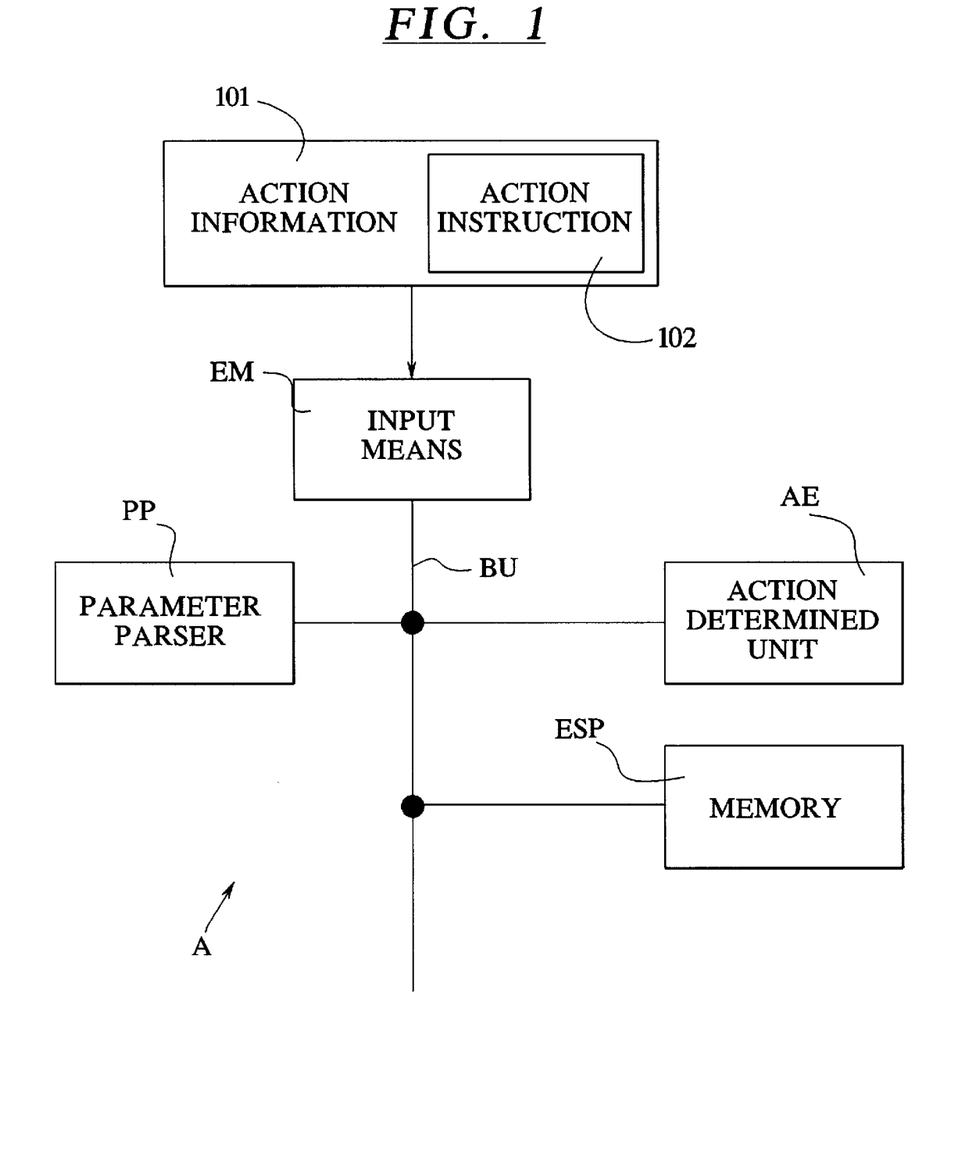
FIG. 1 is a block diagram of the inventive arrangement.

FIG. 1 illustrates a block diagram of an arrangement embodying principles of the invention.

An the arrangement A comprises at least the following components, which are coupled to one another, for example via a bus BU:

an input means EM, an input memory ESP, an action determination unit AE, a parameter parser PP.

FIG. 1 symbolically shows an action information in a first block 101. The action information is handed over to the input means EM by a user B (see FIG. 6), is digitized in the arrangement A and is stored in the input memory ESP as digital action information. The action indication is likewise symbolically shown in FIG. 1 in the form of a second block 102.

It is provided in a development of the arrangement A that the input means EM is realized as a speech recognition unit as disclosed, for example, by G. Ruske, Automatische Spracherkennung, Oldenbourg Verlag, Munich, ISBN 3-486-20877-2, 1. Auflage, pp. 1–10, 1988, incorporated herein by reference, and/or as a tactile input unit. What is to be understood by tactile input unit is, for example, a keyboard, a computer mouse or the like, or what is referred to as a touch screen.

The functioning of the individual components of the arrangement A shall be explained in greater detail below in conjunction with the method.

The action determination unit AE serves, first, for determining action indications and, second, for determining at least one prescribable action that is indicated by the action indicator. The action is determined from an arbitrary plurality of prescribable actions. A person skilled in the art is familiar with various procedures for determining the sought action that is indicated by the action indicator. However, a few possibilities shown in exemplary fashion for the realization thereof shall be explained in detail in conjunction with the method.

The parameter parser PP serves for determining action parameters that are respectively unambiguously allocated to each action, from the digital action information stored in the input memory ESP.

Figure 2:
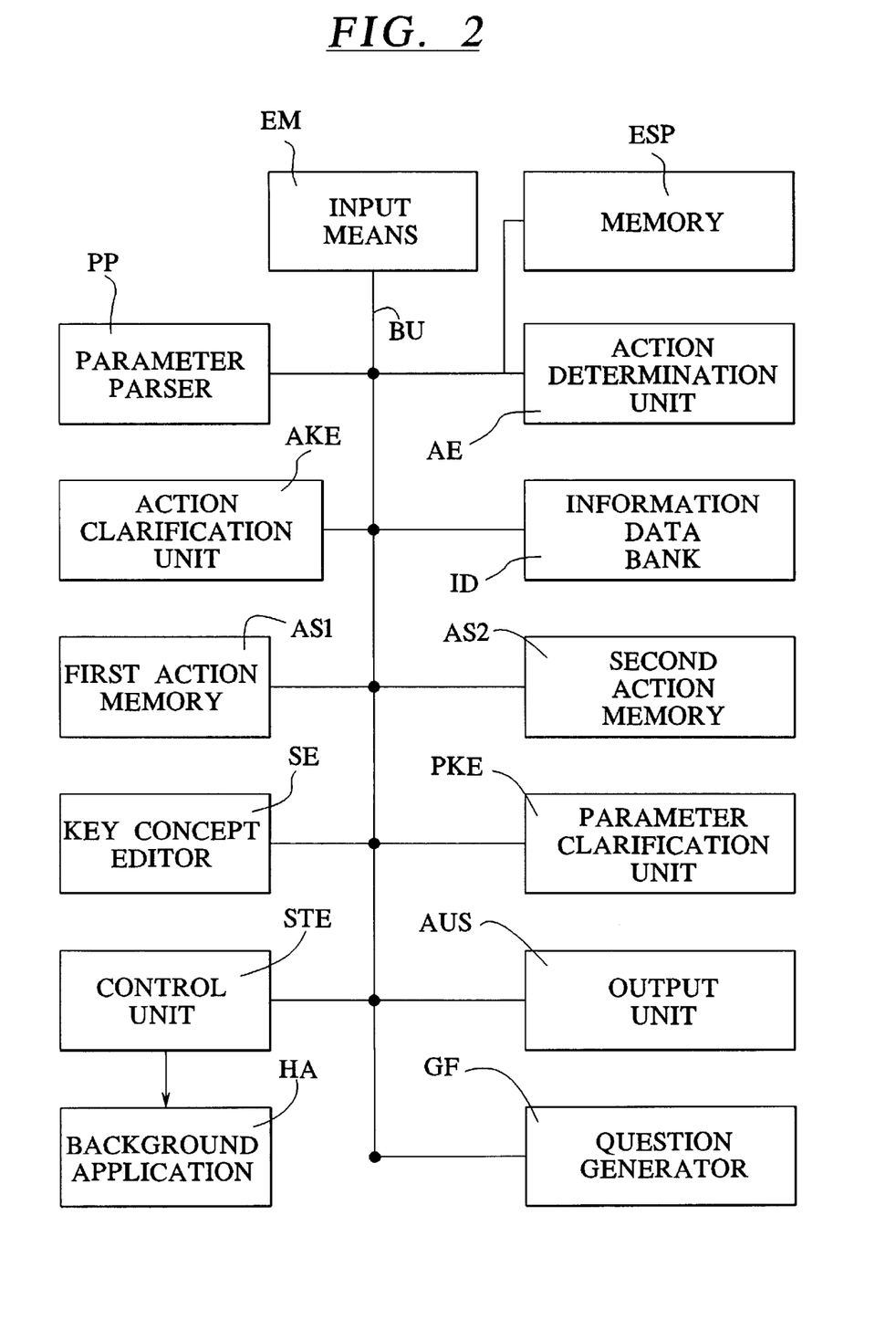
FIG. 2 is a block diagram of the arrangement with a few developments of the arrangement.

FIG. 2 shows the arrangement A with some developments of the arrangement A for action determination.

An information data bank ID provided in a development respectively contains application-specifically sought information that are identified on the basis of the specific action and the action parameters subsequently determined for the action.

In a development, an action clarification unit AKE is provided for determining further action indicators from the user. The action clarification unit AKE particularly gains enhanced significance in fields of application when it is a matter of determining the sought action from different actions. When the action indicators the user B hands over to the arrangement A are not adequate for defining the action, then the action clarification unit AKE is employed for determining further action indicators from the user B. The embodiment of the action clarification unit AKE is explained in greater detail in conjunction with the method. However, it is not necessary that the action clarification unit AKE determine exactly one action. It is likewise provided to reduce the plurality of predetermined actions in an arbitrary way and to thus further-process only a reduced plurality of actions.

In a development, a parameter clarification unit PKE is provided for determining further action parameters from the user B. The parameter clarification unit PKE is employed when all action parameters that are allocated to the respective actions cannot be determined for the at least one determined action. In this case, it is advantageous that the parameter clarification unit PKE is employed in order to determine lacking action parameters from the user B. It is also advantageous in a development of the arrangement A to provide a first action memory AS1 and/or a second action memory AS2. Actions and the action parameters thereof are stored in the first action memory AS1, whereby the at least one action indicator coincides completely with at least a part of key concepts whose significance is described later. Actions and the action parameters thereof are stored in the second action memory AS2, whereby at least one of the action indicators coincides with at least one key concept.

In the one development, a means GF for generating questions (prompts) of the user B for determining further action indicators and/or further action parameters is provided. The structure of the means GF for generating questions is known, for example, from the Caspari, R., 1993, Bottom Up Generation from Flat Semantic Structures, Proc. Deklarative und prozedurale Aspekte der Sprachverarbeitung, Deutsche Gesellschaft für Sprachverarbeitung, Sektion Computerlinguistick, 4. Fachtagung, pp. 1–6, incorporated herein by reference.

In a further development of the arrangement A, an output unit AUS is provided for the output of the determined information. The output unit AUS, for example, can be realized with a picture screen, a printer or with other types of output unit. The output unit AUS, moreover, can also be realized as a loud speaker or as some other form of voice or audible output unit. In this case, a speech synthesis unit is additionally provided with which the digitally existing, identified information is converted into speech signals that are then output for the user B. A version can also be provided in order to implement the verbal output via what are referred to as audio data files.

It is further provided in a development of the arrangement A to employ a control unit STE for controlling a background application HA upon employment of the identified information. The structure of the control unit STE is completely application-specific and merely serves the purpose of employing the determined action for the control of the background application HA. The different employment possibilities and, thus, the different embodiments of the control unit STE are described in detail below.

In another development, a key concept editor SE is provided with which, first, the key concepts described later and, second, new actions and/or action parameters can be modified, removed or added.

Figure 3:
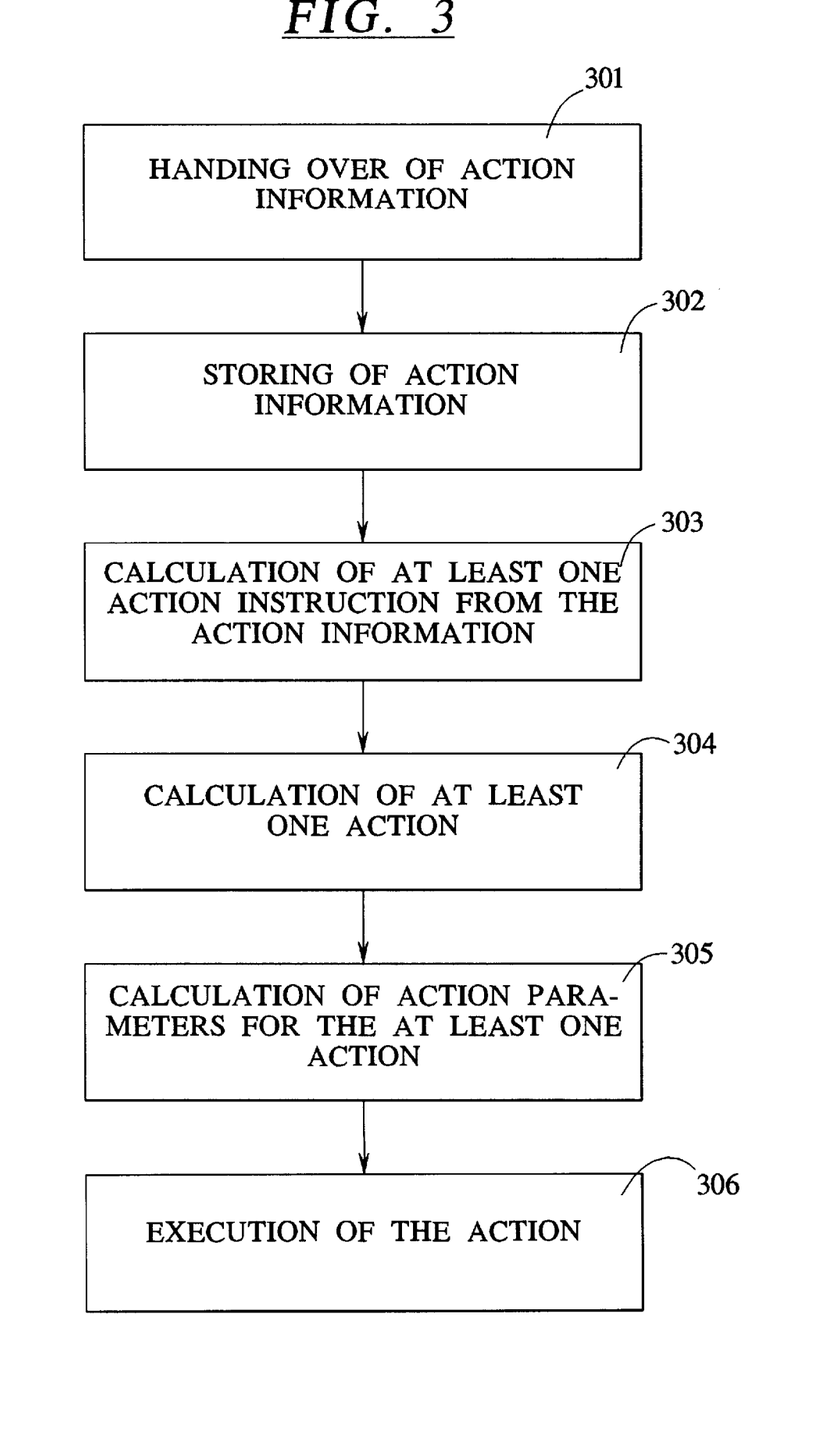
FIG. 3 illustrates Individual method steps of the inventive method in the form of a flow chart.

The individual method steps of the method are shown in FIG. 3.

In a first step 301, the user B gives the arrangement A action information that comprises at least one action indicator. The method need not necessarily be implemented with the application described above; it is likewise possible to implement the method with the assistance of a computer.

The action information is handed over to the arrangement A or the computer by the user B upon employment of the input means EM. The action information is digitized and stored in step 302 as digitized action information. The digital action information can be stored in a phonetic presentation or the form of a standard code as well for the presentation of written characters (for example, ASCII code).

In a further step 303, at least one action indicator is determined from the stored action information upon employment of the parameter parser PP whose structure is known from the Naumann, Sven und Hagen Langer, 1994: Parsing, Stuttgart, Teubner, 1. Auflage, ISBN 3-519-02139-0, pp. 155–166, incorporated herein by reference.

Upon employment of the action indicator and of the action determination unit AE, at least one action is defined in step 304.

The definition of at least one action can ensue in different ways. A very simple method that, however, is definitely not to be exclusively employed, is comprised in allocating a prescribable plurality of key concepts each of which respectively characterizes the action, to each action and in comparing the action indicators determined from the action information that are defined by the parameter parser PP to the key concepts. The comparison can be undertaken by a direct word comparison or, on the other hand, by an arbitrary pattern comparison whose algorithms are at the command of anyone skilled in the art.

For determining the action in the action determination unit AE, it is provided to implement the following steps. The comparison of the key concepts to the action indicators is implemented in the action determination unit AE for every action.

A first set of actions is identified wherein all action indicators coincide with at least a portion of the key concepts. Described concretely, this procedure means that the essence of all actions that were referenced by the action indicators is identified. The first set of actions is stored, for example, in the first action memory AS1. Further, a second set of actions is formed wherein at least a part of the action indicators coincides with the key concepts. This procedure concretely means a formation of the union set of all actions that were indicated. The second set of actions is stored, for example, in the second action memory AS2.

When the first set contains exactly one element, then the action to be determined is unambiguously identified. When the first set, however, contains more elements than the plurality of actions to be determined, then the action is not exactly enough described by the initial user input. In this case, it is advantageous to implement a clarification dialog described later.

When the first set is an empty set, then the initial user expression contains indications of disjunctive actions. In this case, the clarification dialog is advantageously controlled by the actions contained in the second set.

When both the first set as well as the second set are empty sets, then, for example, a clarification dialog is carried out for distinguishing between all actions known in the application.

In this development, the first set and the second set thus serve as a basis for the dialog with the user B to determine the at least one action.

When the at least one action has been determined in step 304, the action parameters that are unambiguously allocated to the actions are determined in step 305 for all actions from the digital action information with the parameter parser PP. The action is then implemented in a last step 306 on the basis of the identified action as well as on the basis of the appertaining action parameters.

Figure 4:
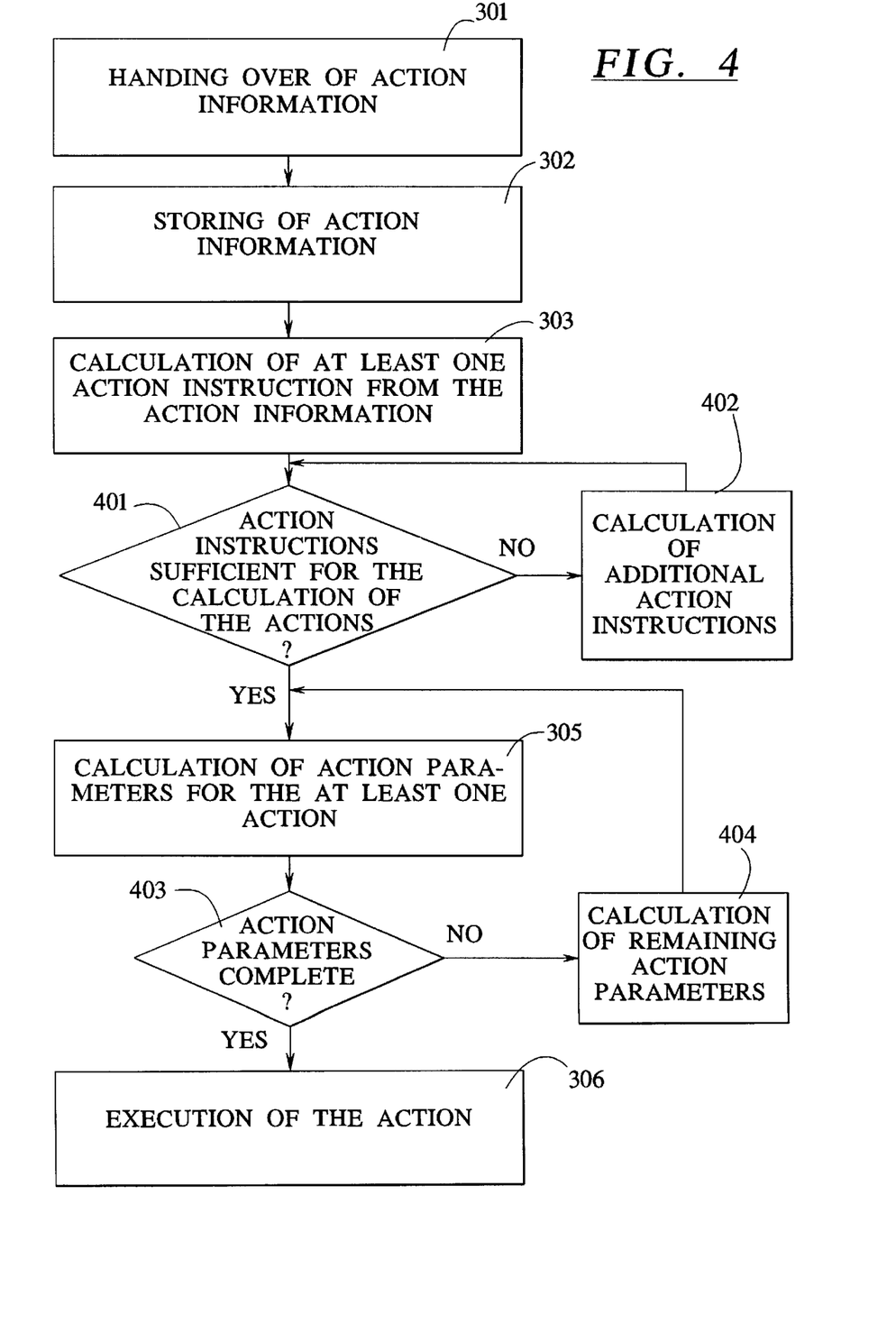
FIG. 4 illustrates a flow chart of the method with further developments thereof.

FIG. 4 shows individual method steps of developments of the method.

In a development of the method, information about the action is identified from the information data bank ID and is presented to the user B via the output unit AUS.

When the action indicators contained in the digital action information are not adequate for the identification step 401 of at least one action, then it is provided in a development to determine in step 402 further action indicators, for example on the basis of a dialog with the user B.

This occurs, for example, upon employment of the action clarification unit AKE that is preferably fashioned such that respectively at least one determination prompt is unambiguously respectively allocated for the prescribed actions. What are to be understood by the determination prompt, for example, are questions that are allocated to the respective action and permanently stored. These determination prompts are presented to the user B given inadequate information for the determination of the actions. Via the input means EM, the user B provides answers to these determination prompts, i.e., to the corresponding questions, these answers being then in turn processed, as a result whereof further action indicators are determined. The dialog is continued and repeated until the determined action indicators and further action indicators are adequate for the identification of the prescribable plurality of actions.

When the at least one action is determined, the action parameters that are allocated to the respective action are identified in step 305 for each action.

When, however, all required action parameters are not known or, respectively, have not been determined completely from the digital action information identified in the input memory ESP, this being checked in an additional method step 403, the remaining action parameters are determined in step 404, for example, by the parameter clarification unit PKE.

This, for example, likewise ensues in a dialog with the user B. Prompts allocated to the individual parameters, referred to below as parameter prompts, can again be employed for this dialog, these being output to the user B given necessary identification of the corresponding action parameters at the user B replying to the corresponding questions.

Both the determination of further action indicators in step 402 as well as the determination of the remaining action parameters in step 404, however, can ensue in some other way.

For example, it is not absolutely necessary to allocate permanently prescribed determination prompts or parameter prompts to the individual actions or, respectively, parameters, as a result whereof, first, the simplicity in the implementation of the method and in the adaptation of the respective application and the expandability of the actions and parameters is in effect substantially simplified but permanently prescribed questions must always be asked of the user B.

It is provided in a development of the method and of the arrangement A that means GF for generating questions for the user B be employed. One possibility for realizing the means GF is described, for example, in Caspari, R., 1993, Bottom Up Generation from Flat Semantic Structures, Proc. Deklarative und prozedurale Aspekte der Sprachverarbeitung, Deutsche Gesellschaft für Sprachverarbeitung, Sektion Computerlinguistick, 4. Fachtagung, pp. 1–6, incorporated herein by reference.

The identified action can be utilized for the control of at least one background application HA in a development of the method.

Figure 5:
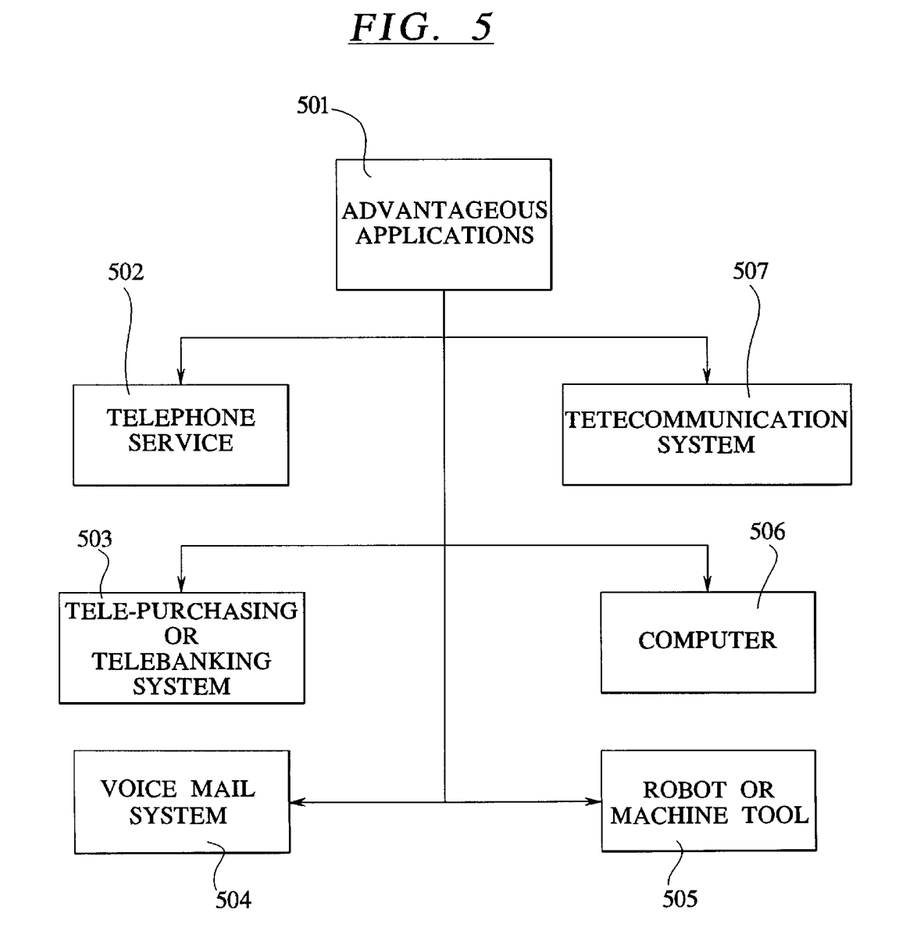
FIG. 5 is a block diagram illustrating an overview of a few possible applications of the arrangement as well as of the method.

What are to be understood by background applications HA are the greatest variety of use possibilities of the method and of the arrangement A that are explained later and shown in FIG. 5.

The method as well as the arrangement A can be advantageously utilized, for example, in the following fields:

in a telephone service 502, in a tele-purchasing system and/or tele-banking system 503;

in what is referred to as a voice mail handling system 504;

for the control of an arbitrary machine, for example of a machine tool or of a robot 505;

for the control of a computer 506;

in a messaging system of a private branch exchange of a telecommunication system 507.

Further, it is advantageous in a development of the method that the evaluation of the digital action information that is stored in the input memory ESP are determined by the parameter parser PP in reverse sequence with respect to the input of the action information.

This means that the evaluation of the action information is begun at the end of the action information and is continued up to the start of the action information. A correction of the action information by the user B in a sentence is possible as a result of this procedure, this being explained later.

For easier understanding, a very simple example from the field of tourism is presented below. For this example, the following actions can be defined in this area of employment:

information about rail connections;

information about air connections;

information about sea connections;

information about hotel rooms;

restaurant information.

The individual actions can, for example, be characterized by the following parameters:

| | |
|---|---|
| Rail information: | <point of departure>, <destination>, <date>, <time of day> |
| Air information: | <point of departure>, <destination>, <date>, <time of day> |
| Sea information: | <point of departure>, <destination>, <date>, <time of day> |
| Hotel information: | <town>, <room>, <type>, <number of persons>, <check-in date>, <check-out date> |
| Restaurant information: | <town>, <type>, <category>. |

The individual actions are subsequently specified in the form of a pseudo-code. A number is thereby respectively unambiguously allocated to the action under point 2.1, the respective determination prompt under point 2.2 and the individual parameter specifications under the point 2.3 that, respectively dependent on the defined grammar in this case for prescribed parameter prompts, are presented in such a way that the respective grammar of the respective action parameters is respectively established under point 3.1 and point 3.3 and the respective parameter prompt is presented under point 3.2.

Action (rail information)
   {2.1: number =1
   2.2: determination prompt = "Would you like to have rail information?"
   2.3: parameter specifications = {parameter
               {3.1: g_departure (X)
                       3.2: "Please name the desired point of departure."
                       3.3: g_location (X)
                       }
               parameter
                       {3.1: g_arrival (Y)
                       3.2: "Please name the desired destination location."
                       3.3: g_location (Y)
                       }
               parameter
                       {3.1: g_date (Z)
                       3.2: "On what date do you want to travel?"
                       3.3: g_date (Z)
                       }
               parameter
                       {3.1.: g_time of day (W)
                       3.2: "At what time do you want to travel?"
                       3.3: g_time of day (W)
                       }
               }
   2.4: Action indicators = {from, to, travel, train information, Railroad, rail information}
   2.3: confirmation prompt =
           "You are being given information about the trains from X to Y on Z a W o'clock."
   }
Action (flight information)
   {2.1: number = 2 =
   2.2: determination prompt = "Would you like to have flight information?"
   2.3: parameter specifications = {parameter
               {3.1: g_departure (X)
                       3.2: "Please name the desired point of departure."
                       3.3: g_location (X)
                       }
               parameter
                       {3.1: g_arrival (Y)
                       3.2: "Please name the desired destination location."
                       3.3: g_location (Y)
                       }
               parameter
                       {3.1: g_date (Z)
                       3.2: "On what date do you want to fly?"
                       3.3: g_date (Z)
                       }
               parameter
                       {3.1: g_time of day (W)
                       3.2: "At what time do you want to fly?"
                       3.3: g_time of day (W)
                       }
               }
   2.4: Action indicators = {from, to, travel, flying, flight information, airplane}
   2.3: Confirmation prompt =
       "You are being given information about the flights from X to Y on Z a W o'clock."
   }
Action (sea information)
   {2.1: number = 3
   2.2: determination prompt "Do you want to have sea [travel] information?
   2.3: parameter specifications = {parameter
               {3.1: g_departure (X)
                       3.2: "Please name the desired point of departure."
                       3.3: g_location (X)
                       }
               parameter
                       {3.1: g_arrival (Y)
                       3.2: "Please name the desired destination location."

-continued

```
                3.3: g_location (Y)
                }
            parameter
            {3.1: g_date (Z)
                3.2: "On what date do you want to
travel?"
                3.3: g_date (Z)
                }
            parameter
            {3.1: g_time of day (W)
                3.2: "At what time do you want to
travel?"
                3.3: g_time of day (W)
                }
            }
    2.4: Action indicators = {from, to, travel, sea information, ship}
    2.3: Conformation prompt =
        "You are being given information about the ship connections
from X to Y on Z a W o'clock."
}
Action (hotel information)
    {2.1: number = 4
    2.2: determination prompt = "Would you like to have hotel information?"
    2.3: parameter specification = {parameter
            {3.1: g_location indication (X)
                3.2: "In what town are you looking for
a hotel?"
                3.3: g_location indication (X)
                }
            parameter
            {3.1: g_type of room (Y)
                3.2: "Are you looking for a single room
or double room?"
                3.3: g_type of room (Y)
                }
            parameter
            {3.1: g_number_persons (Z)
                3.2: "For how many persons are you
looking for a room?"
                3.3: g_number_persons (Z)
                }
            parameter
            {3.1: g_from_date (W)
                3.2: "When would you like to check in?"
                3.3: g_date (W)
                }
            parameter
            {3.1: g_until_date (V)
                3.2: "When would you like to check
out?"
                3.3: g_date (V)
                }
            }
    2.4: Action indicators = {hotel, accommodations, single room, double
room, room}
    2.5: Confirmation prompt +
        "You are receiving information about hotels in X that have Y
available for Z persons from W until V."
}
Action (restaurant information)
    {2.1: number = 5
    2.2: determination prompt = "Would you like to have restaurant
information?"
    2.3: parameter specification = {parameter
            {3.1: g_location indication (X)
                3.2: "In what town would you like to go
out to eat?"
                3.3: g_location (X)
                }
            parameter
            {3.1: g_type (Y)
                3.2: "Please say what type you would
like."
                3.3: g_type (Y)
                }
            parameter
            {3.1: g_category (Z)
                3.2: "Please say what category you
would like."
```

-continued

```
        3.3: g_category (Z)
        }
    }
    2.4.: action indicators = {restaurant, eat}
    2.5: confirmation prompt =
        "You are receiving information about Y restaurants of the Z
category in X."
}
```

Key concepts for the individual actions that are unambiguously identified by the corresponding number in the looped brackets are recited by way of example in the following table.

| | |
|---|---|
| From | {1, 2, 3} |
| To | {1, 2, 3} |
| Travel | {1, 2, 3} |
| Train Information | {1} |
| Railroad | {1} |
| Fly | {2} |
| Flight Information | {2} |
| Airplane | {2} |
| Sea Information | {3} |
| Ship | {3} |
| Hotel | {4} |
| Accommodation | {5} |
| Single Room | {4} |
| Double Room | {4} |
| Restaurant | {5} |
| Eat | {5} |

Examples of dialogs of the user B with the arrangement A are presented below.

Case 1:
The user B can express his wish precisely and completely.
The user B inputs the following information:
"I would like to travel by train from Munich to Hamburg on Jan. 1, 1996 at 5:00".
The first action memory ASI contains the first set of actions {1} upon employment of the above-described key concepts and grammars. The second action memory AS2 contains the second set of action {1, 2, 3}.
Since the first action memory ASI comprises exactly one element, the sought information is determined directly by the arrangement A from the information data bank ID and, for example, this is presented to the B with the following answer:
"You are receiving information about the flights [sic!] from Munich to Hamburg on Jan. 1, 1996 at 5:00: "First flight, second flight, third flight, etc. . . .".

Case 2:
The user B sights neither time nor transportation means:
The action information is, for example, as follows:
"I would like to go from Munich to Hamburg on Jan. 1, 1996."
In this case, the first action memory AS1 contains the first set of actions {1, 2, 3}. The second action memory AS2 contains the second set of actions {1, 2, 3}. A clarification dialog is initiated in the arrangement A in order to distinguish between the actions {1, 2, 3}.
For this purpose, for example, the above-described determination prompt:
"Would you like train information?"
is output to the user B.
The user B answers, for example, "No".
In this case, the arrangement A outputs, for example, the following determination prompt:
"Would you like flight information?"
When the user B answers this question with "Yes", then a further clarification dialog is carried out for determining the remaining as yet lacking action parameters for the flight information. For this purpose, for example, the parameter prompt for determining the action parameter of time of day:
"At what time would you like to fly?"
is output to the user B.
The user B answers, for example:
"At 5:00."
The arrangement A now has sufficient information in order to determine the sought action. The result is presented to the user B in, for example, the following way:
"You are receiving information about the flights from Munich to Hamburg on Jan. 1, 1996 at 5:00".

Case 3:
The user B asks about a number of actions at one time:
In this case, for example, the action information could be established by the following statement: "I want to go to Hamburg and I am looking for a double room there".
The first action memory AS1 contains no element; the second action memory AS2 contains the second set of action {1, 2, 3, 4}. A clarification dialog is initiated in the arrangement A in order to discriminate between the actions {1, 2, 3, 4}.
Determination prompt: "Would you like train information?"
User B: "No".
Determination prompt: "Would you like flight information?"
User b: "Yes".
In this case, too, some action parameters are missing that are determined via the clarification dialog by the parameter clarification dialog PKE.
Parameter prompt: "Please say the desired point of departure".
User B: "Munich".
Parameter prompt: "On what date would you like to fly".
User B: "On Jan. 1, 1996".
Parameter prompt: "At what time of day would you like to fly?".
User B: "At 5:00".
The result is presented to the user B in, for example, the following way:
"You are receiving information about the flights from Munich to Hamburg on Jan. 1, 1996 at 5:00."
It is to be emphasized in this context that the action need not be present only in the form of key concepts or, generally, of words but can also be present in the form of arbitrarily prescribable events such as, for example, a mouse click of a computer mouse, the position of a cursor or of a mouse or similar events that are specifically designed for the respective application.
In addition to ensuing by natural language input, the interrogation of the action parameters can ensue by pop-up menus or the like. The input of a user can also ensue via selection of an item from a menu or the like. In a development of the arrangement A as well as of the method, it is provided to give the user B the possibility at any time, i.e., at any stage of the procedure, of making a correction on his own or undertaking a supplementation of the action information. A distinction is made below between corrections in the action information itself as well as corrections and additions during the action and parameter clarification dialogs.

Given corrections in the initial statement itself, i.e., in the action information, the user B can correct particulars in that the user inputs them chronologically following the particulars to be corrected.

An example can thereby be comprised in the following action information: "I would like to fly from Munich to Hamburg at 4:00, i.e., actually rather at 4:30."

The correction possibility is realized in that the parameter parser PP for the analysis processes the particulars of the action information respectively beginning from the end of the action information or, respectively, respectively determines the one particular from the last suitable phrase with respect to the defined grammar of the respective particular.

In this example, the suitable time would be 4:30.

For the corrections and additions during the action and parameter clarification dialogs, it is advantageous to provide the user B with the possibility at every dialog step of correcting previous statements and adding to them. This, for example, can be achieved by the following, advantageous expansion of the arrangement A.

The input memory ESP for the action information is expanded to form a dynamic memory in which the current status of the dialog being conducted is respectively deposited. Further, another dynamic memory is setup for the respectively allowable actions. At the beginning of the dialog, this further dynamic memory contains all actions known to the system. Only the actions stored in the memory for the respectively allowable actions are respectively taken into consideration in the action determination unit AE. All other actions are precluded from the very outset.

The following, simple analog example shows how the dialog can be made more flexible as a result of the expansion:

The action information reads: "I want to go to Munich". The input memory ESP contains: "I want to go to Munich". The first action memory AS1 contains the first set of actions {1, 2, 3}. The second action memory AS2 contains the second set of actions {1, 2, 3}. The memory for allowable actions contains {1, 2, 3, 4, 5}.

Determination prompt:
"Would you like rail information?"
The action clarification dialog is thus started.

User B: "No I would like to fly from Hamburg".

The user B answers the determination prompt and additionally names the action and the point of departure. Since the first determination prompt was negatively replied to by the user B, action 1 is already precluded and the memory for allowable actions now contains: {2, 3, 4, 5}.

The input memory ESP contains: "I want to go to Munich no I would like to fly from Hamburg".

The method for determining the action is carried out again, now with respect to the current content of the input memory ESP. In accord therewith, the first action memory AS1 contains the first set of actions {2}, the second action memory AS2 contains the second set of actions {2, 3}. The action has now been unambiguously determined and the action parameters are identified from the input memory ESP. The result of the parameter analysis is deposited, for example, in the input memory ESP.

Accordingly, the input memory ESP contains: "I want g_arrival (Munich) no I want g_departure (Hamburg) fly".

The lacking action parameters are now determined in a further dialog:
Parameter prompt: "On what date would you like to fly?"
User B: "Day after tomorrow at 7:00".

Even though the user B has answered the parameter prompt in the form of common parlance, the input cannot be analyzed with the grammar g_date cited under 3.3. In this case, the input memory ESP is updated. The input memory ESP now contains: "II want g_arrval (Munich) no I want g_Hamburg fly from day after tomorrow 7:00".

The determination of the action as well as of the action parameters by the parameter parser PP is implemented again, whereby the first action memory AS1 again contains the first set of bracketed actions {2} and the second action memory AS2 contains the second set {2, 3}. The action parameter g_arrval (Munich) and g_departure Hamburg are already known and are transferred there into.

Date and time of day are determined from the action information stored in the input memory ESP. The result of the parameter analysis is deposited in the input memory ESP. Accordingly, the input memory ESP contains: "I want g_arrval Munich no I want g_departure Hamburg to fly g_date (day after tomorrow) g_time of day 7:00".

After determination of the action, a determination is potentially made in the implementation of the action from the information data bank ID and the information is presented to the user B in, for example, the following way: "Searching for your flight connection on Dec. 21, 1995 from Munich to Hamburg at 7:00."

Figure 6:
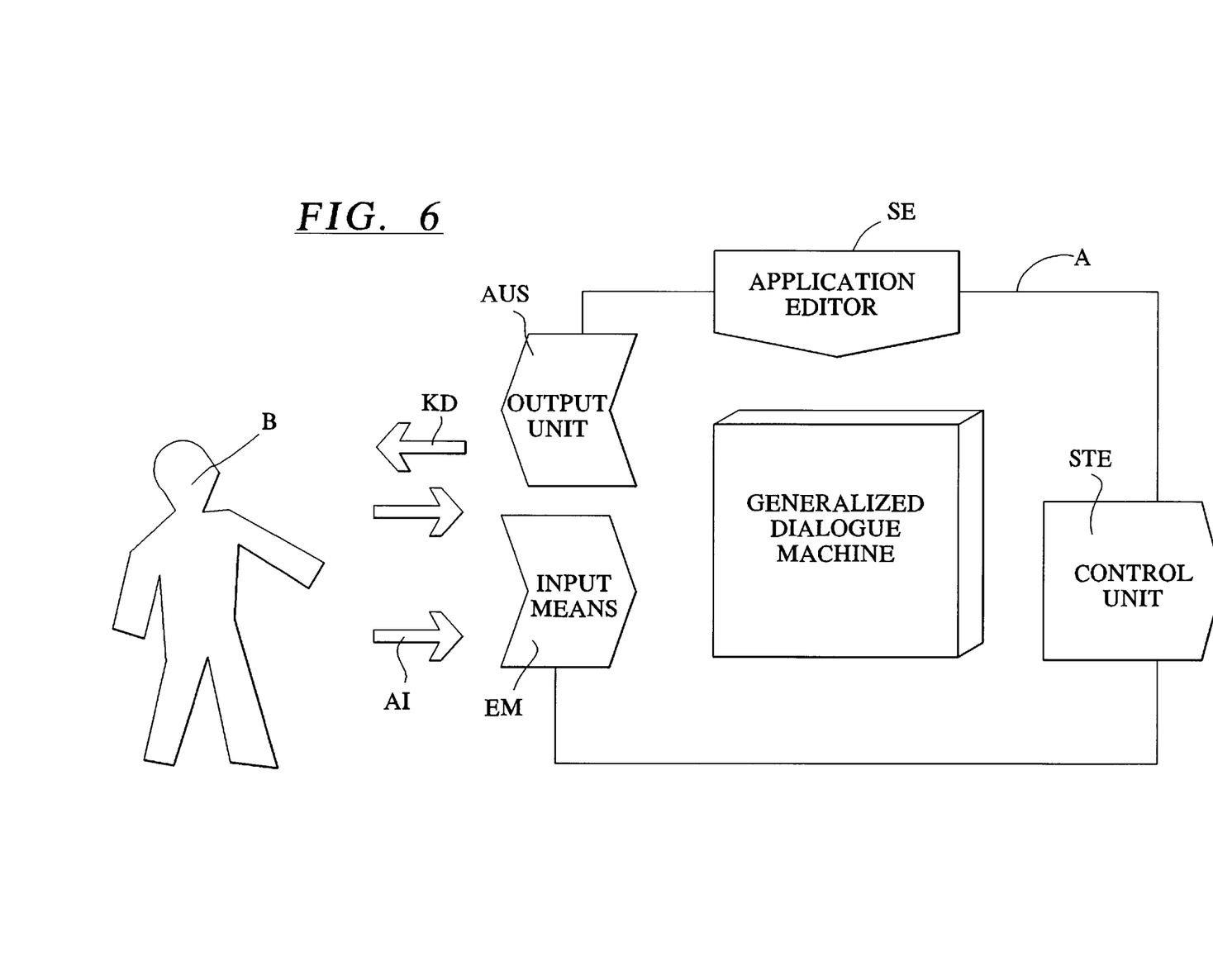
FIG. 6 is a block diagram illustrating a user and the arrangement with some developments thereof, whereby the interaction of the arrangement with the user is shown.

FIG. 6 shows the user B with the arrangement A for action determination as well as a few developments thereof. And arrow IA indicates the action information that the user B gives to the arrangement A. The input means EM as well as an output unit AUS are also shown. A clarification dialog KD is also symbolically indicated by a double arrow. The clarification dialog KD can be employed both for determining the actions as well as for the determination of the action parameters.

A key concept editor SE as well as the control unit STE for controlling a background application HA are also shown.

I claim:

1. A speech recognition system which identifies an action to be taken upon receipt of a command that is given to the system by a user's speech, comprising:

(a) at least one speech recognition unit EM via which the command is received and recognized, (b) an input memory ESP in which the command is stored, (c) an action determination unit (AE) which identifies at least one action which is indicated by an action indicator, the action determination unit (AE) is being constructed such that (1) a first set of actions is formed in which the actions are stored wherein all action indicators coincide with at least one part of prescribable key concepts that are allocated to an action, (2) that a second set of actions is formed in which the actions are stored wherein at least a part of the action indicators coincide with at least the part of the prescribable key concepts, and (3) the first set of actions and/or the second set of actions is employed as a basis for the unambiguous determination of the action indicated by the command, and (d) a parameter parser (PP) with which action parameters prescribable from the command that are allocated to an action and are employed for the execution of the action are identified.

2. The system according to claim 1, further comprising a tactile input unit.

3. The system according to claim 2, whereby a means (GF) for generating questions for the user is provided for determining further action indicators and/or further action parameters.

4. The system according to claim 1 or claim 2,
(a) whereby for that instance wherein the first set contains exactly one action, this action is the determined action, (b) whereby an action clarification unit (AKE) is provided for determining at least a further action indicator from the user for that case wherein the first group does not contain at exactly one action, and (c) whereby the action clarification unit (AKE) is constructed such that, when the first group contains no action, the determination of the further action indicator ensues taking the actions contained in the second group into consideration.

5. The system according to claim 1 or 2, whereby a parameter clarification unit (PKE) is provided for determining further action parameters from the user.

6. The system according to claim 1 or 2, whereby a key work editor (SE) is provided for inputting key concepts by the user.

7. The system according to claim 1 or 2, whereby an information data bank (ID) is provided in which information is determined on the basis of the action and of the action parameters.

8. The system according to one claim 1 or 2, whereby at least one output unit (AUS) is provided for the output of information.

9. The system according to claim 1 or 2, whereby a control unit (STE) is provided for controlling a background application (HA) upon employment of the identified information.

10. The system of claim 1 wherein the system is a telephone service.

11. The system of claim 1 wherein the system is a voice mail handling system.

12. A method for recognizing speech and determining for an action to be undertaken upon receipt of a command in digital format that comprises at least one action indicator, using a computer, comprising the steps of:

(a) receiving and recognizing speech of a user, (b) recognizing a command in said speech, (c) providing the a command to the computer, (d) storing the a command in a memory, (e) selecting from a group of prescribable actions to which a prescribable plurality of action parameters are allocated, at least one action to be undertaken on the basis of the at least one action indicator in the command, (f) storing a first set of actions whose action indicators coincide with key concepts and a second set of actions wherein at least a part of the action indicators coincide with the key concepts, and (g) employing the first set of actions and/or the second set of actions as a basis for the unambiguous determination of the action, (h) determining for the action the action parameters that are allocated to the action and that are employed for the execution of the action, and (i) implementing the determined action.

13. The method according to claim 12, whereby the information for the action are determined on the basis of the action parameters and of an information data bank (ID).

14. The method according to claim 12 or 13, whereby the command is spoken by the user, and whereby the command is recognized in a speech recognition unit.

15. The method according to claim 12 or 13, whereby the command is input by the user with a tactile input unit.

16. The method according to claim 12 or 13, whereby, when the action indicator is not sufficient for unambiguous determination of an action, further action indicators are determined in a prescribable dialog with the user stored in the computer.

17. The method according to claim 12 or 13, whereby, when the action parameters allocated to the action where not completely identified for the specific action, the remaining action parameters are determined in a prescribable dialog with the user stored in the computer.

18. The method according to claim 12 or 13, whereby the determination of the action ensues in such a way that the at least one action indicator is compared to key concepts that were unambiguously allocated to the actions and the action is determined from the prescribable plurality of actions whose key concepts coincide best with the action indicators with respect to a similarity degree.

19. The method according to one of the claim 12 or 13, whereby the action parameters from the command that were stored in the input memory (ESP) are determined in the parameter parser (PP) in reverse sequence with respect to the input.

20. The method according to claim 12 or 13, whereby a background application (HA) is controlled with the identified information.

* * * * *